United States Patent [19]

Ramun

[11] Patent Number: 4,881,459
[45] Date of Patent: Nov. 21, 1989

[54] HYDRAULIC SCRAP SHEAR

[75] Inventor: John R. Ramun, Youngstown, Ohio

[73] Assignee: Allied Gator, Inc., Youngstown, Ohio

[21] Appl. No.: 169,277

[22] Filed: Mar. 17, 1988

[51] Int. Cl.⁴ .................. B30B 9/32; B30B 15/06; B26B 5/12

[52] U.S. Cl. .................. 100/95; 100/98 R; 100/100; 100/215; 83/636; 83/923; 83/928

[58] Field of Search .................. 100/94-97, 100/98 A, 215, 100, 98 R; 83/620, 636, 694, 923, 928

[56] References Cited

U.S. PATENT DOCUMENTS

| | | | |
|---|---|---|---|
| 1,357,727 | 11/1920 | Roach | 83/620 |
| 1,765,317 | 6/1930 | Ungar | 83/694 |
| 2,038,857 | 4/1936 | Rutter et al. | 83/620 |
| 2,816,502 | 12/1957 | Eismann | 100/100 |
| 3,157,082 | 11/1964 | Thompson | 83/923 |
| 3,377,946 | 4/1968 | Garland | 83/923 |
| 3,521,515 | 7/1970 | Aramini | 83/620 |
| 3,615,084 | 10/1971 | Wasinger | 83/923 |
| 3,965,812 | 6/1976 | Oberg | 100/100 |
| 4,253,388 | 3/1981 | Vezzoni | 83/923 |
| 4,273,171 | 6/1981 | Spaulding, Sr. | 83/928 |
| 4,338,840 | 7/1982 | Farrell, Sr. et al. | 83/928 |
| 4,347,724 | 9/1972 | Brown et al. | 83/623 |
| 4,552,062 | 11/1985 | Vezzani | 100/95 |
| 4,727,786 | 3/1988 | Quante et al. | 100/95 |

FOREIGN PATENT DOCUMENTS

| | | | |
|---|---|---|---|
| 46-36949 | 10/1971 | Japan | 83/620 |
| 6410737 | 5/1965 | Netherlands | 83/320 |
| 0664770 | 5/1979 | U.S.S.R. | 83/923 |

Primary Examiner—Harvey C. Hornsby
Assistant Examiner—Joseph S. Machuga
Attorney, Agent, or Firm—Harpman & Harpman

[57] ABSTRACT

A hydraulic scrap shear having a multiple segmented shearing blade configuration at one end of a feed channel. The shearing blade configuration compresses and cuts the scrap into multiple uniform chunks on a single cycle.

6 Claims, 4 Drawing Sheets

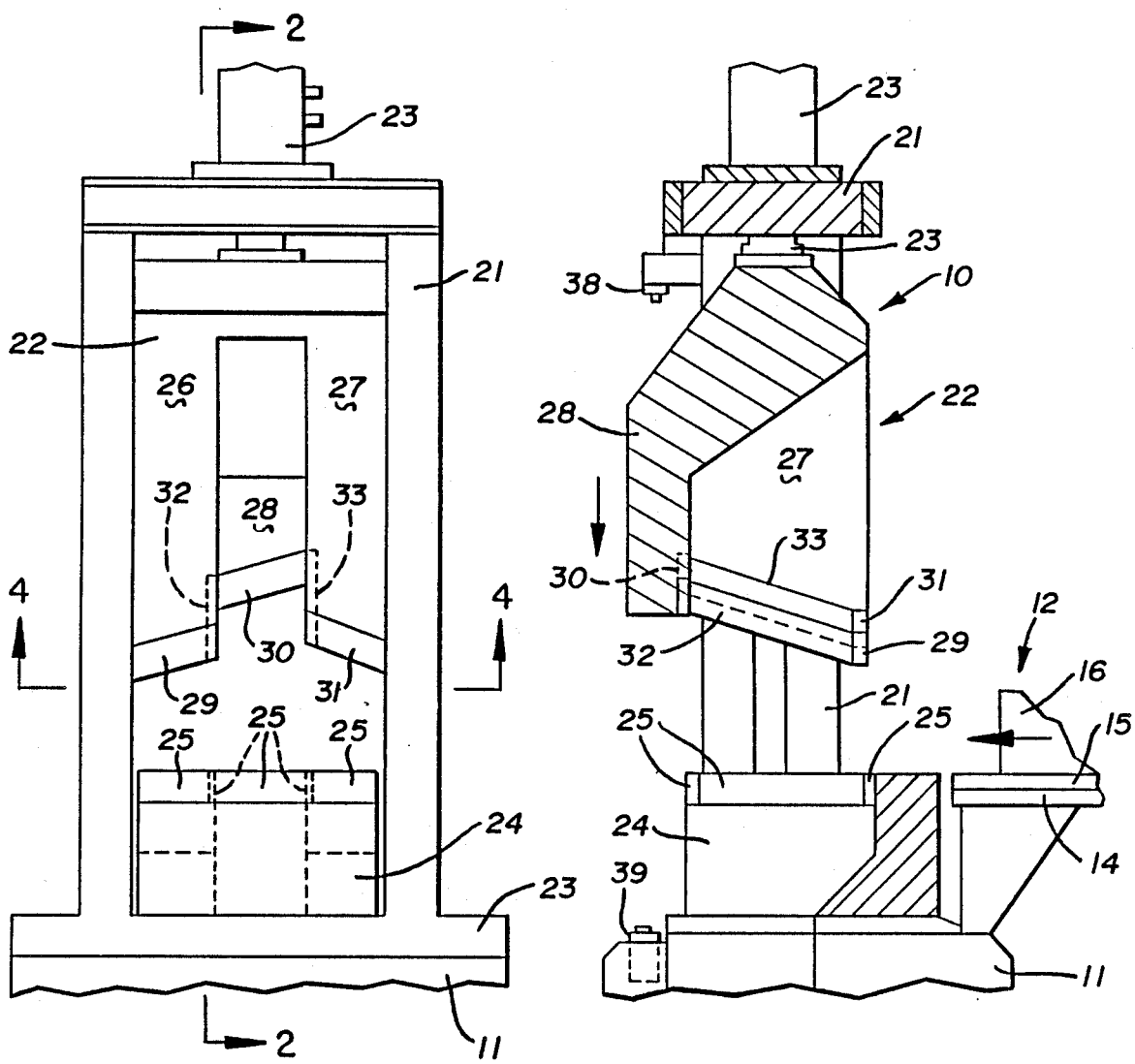
FIG. 1
FIG. 2
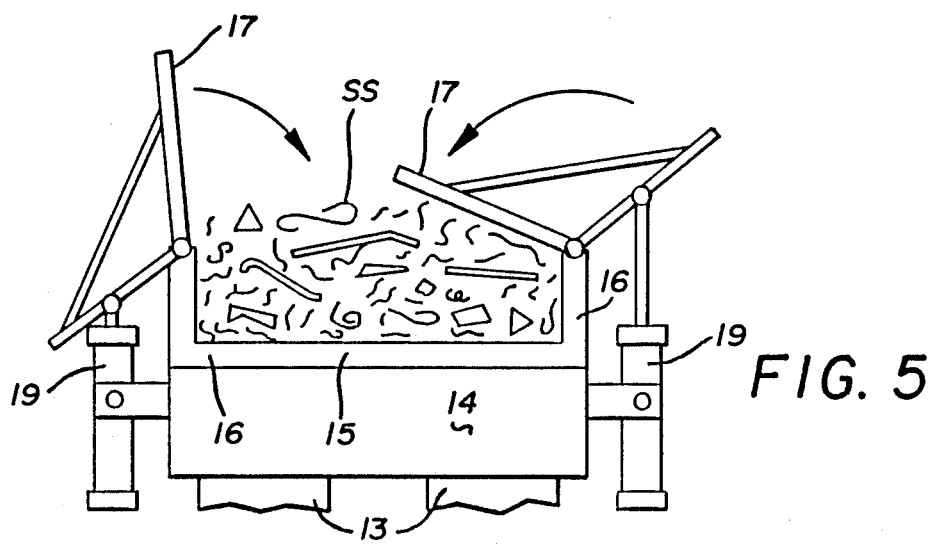
FIG. 5

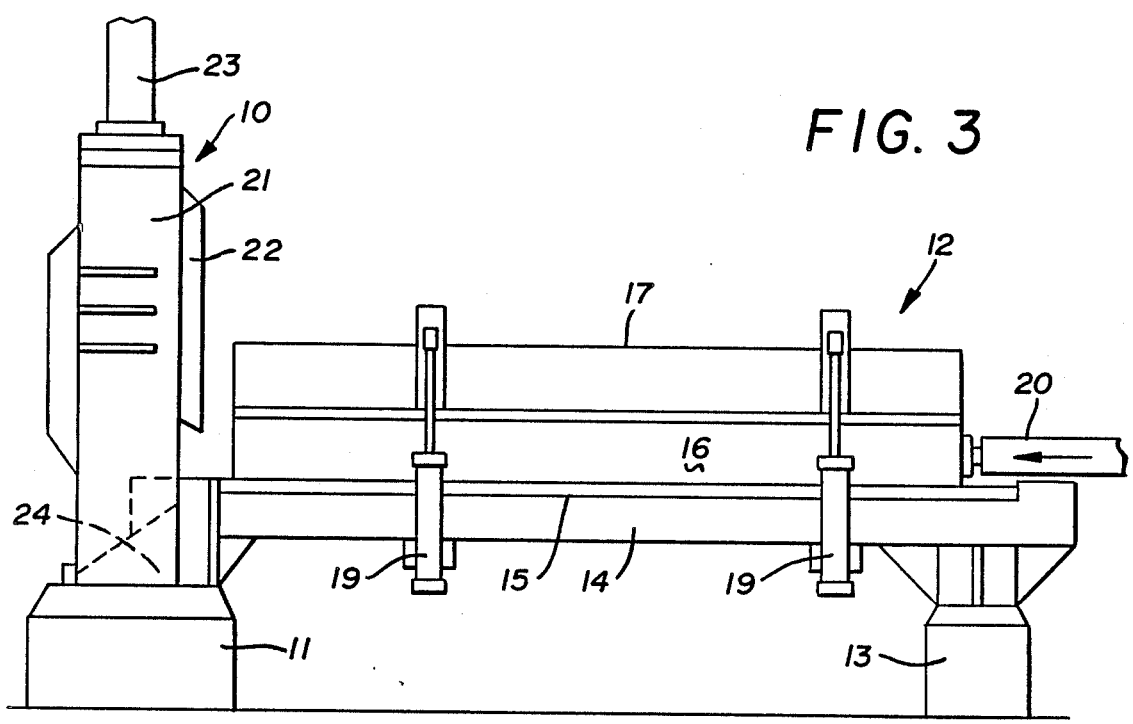
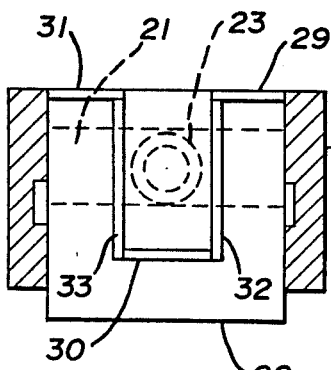
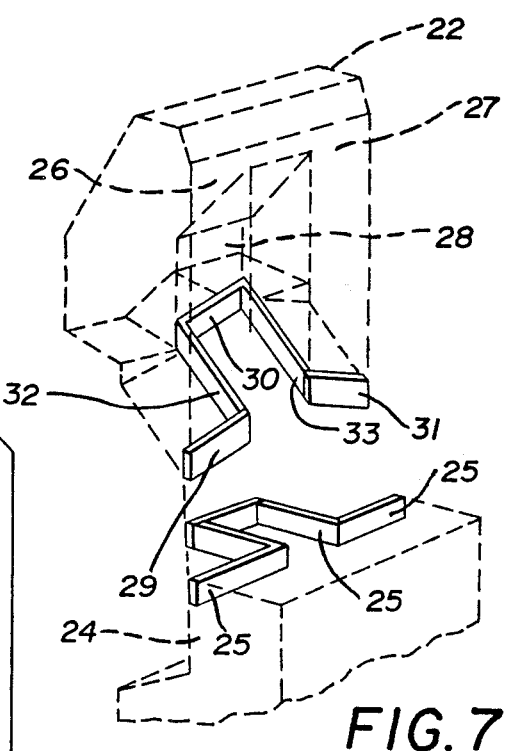
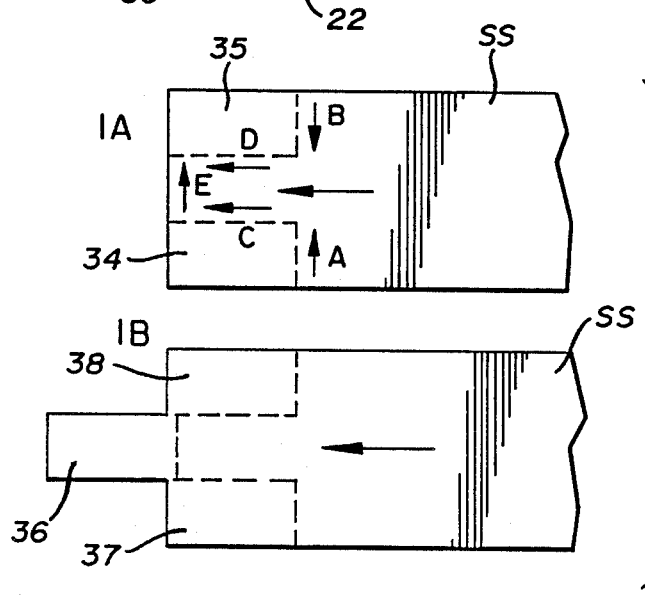
FIG. 3
FIG. 4
FIG. 7
FIG. 6

HYDRAULIC SCRAP SHEAR

BACKGROUND OF THE INVENTION

1. Technical Field

Hydraulic scrap shears of this type are used to cut and press scrap into usable and transportable sizes. The scrap is normally presented to the shear in a open feed channel that conforms the scrap into an elongated semi-continuous band by compression both longitudinally and often vertically. Standard scrap shears of this type are required to process the scrap twice, first cutting the scrap band transversely then refeeding the cut portions to be cut again into uniform shapes for transport and use.

2. Description of Prior Art

Prior Art devices of this type have relied on a variety of different shear configurations and scrap preparation and presentation to the shears, see for example U.S. Pat. Nos. 3,615,084, 3,945,315, 3,949,634 and 4,552,062.

In U.S. Pat. No. 3,615,084 a process and apparatus for salvaging junk material is disclosed having a crusher, a shear, incinerator, a tumbler and a baler.

The shear has a feed hopper and a crusher plate extending around and outwardly from the shear blades. The blades are positioned in a sequential stepped pattern performing step cuts both transversely and horizontally on the scrap, that is compressed before cutting.

U.S. Pat. No. 3,945,315 shows a scrap shear having a single shearing blade and a offset combined stamper and hold down driven by a separate independent hydraulic piston and cylinder. A feed channel supplies scrap to the shear by a ram.

U.S. Pat. No. 3,949,634 discloses a single bladed scrap shear with a charging table to present the scrap to the shear.

Finally, in U.S. Pat. No. 4,552,062 a device is directed to a scrap metal press with an independent scrap shear to first compress the scrap in front of the shear then cut the compressed scrap into elongated bales.

SUMMARY OF THE INVENTION

A hydraulic scrap shear for compressing and cutting scrap into uniform and usable blocks in a single cycle. The shear has a multiple bladed configuration that provides for right angular independent multiple cuts in a sequential fashion cutting and compressing the scrap at the points of engagement.

DESCRIPTION OF THE DRAWINGS

FIG. 1 is a front plan view of the multiple bladed shear;

FIG. 2 is a cross-section on lines 2—2 of FIG. 1;

FIG. 3 is a side plan view of the shear and associated scrap feeder channel;

FIG. 4 is a cross-sectional view on lines 4—4 of FIG. 1;

FIG. 5 is an end plan view of the scrap feeder channel;

FIG. 6 is a graphic representation of the cutting sequence of the shear;

FIG. 7 is a detailed perspective view of the blades of the shear on the shear member shown in broken lines;

DESCRIPTION OF THE PREFERRED EMBODIMENT

Figure 9:
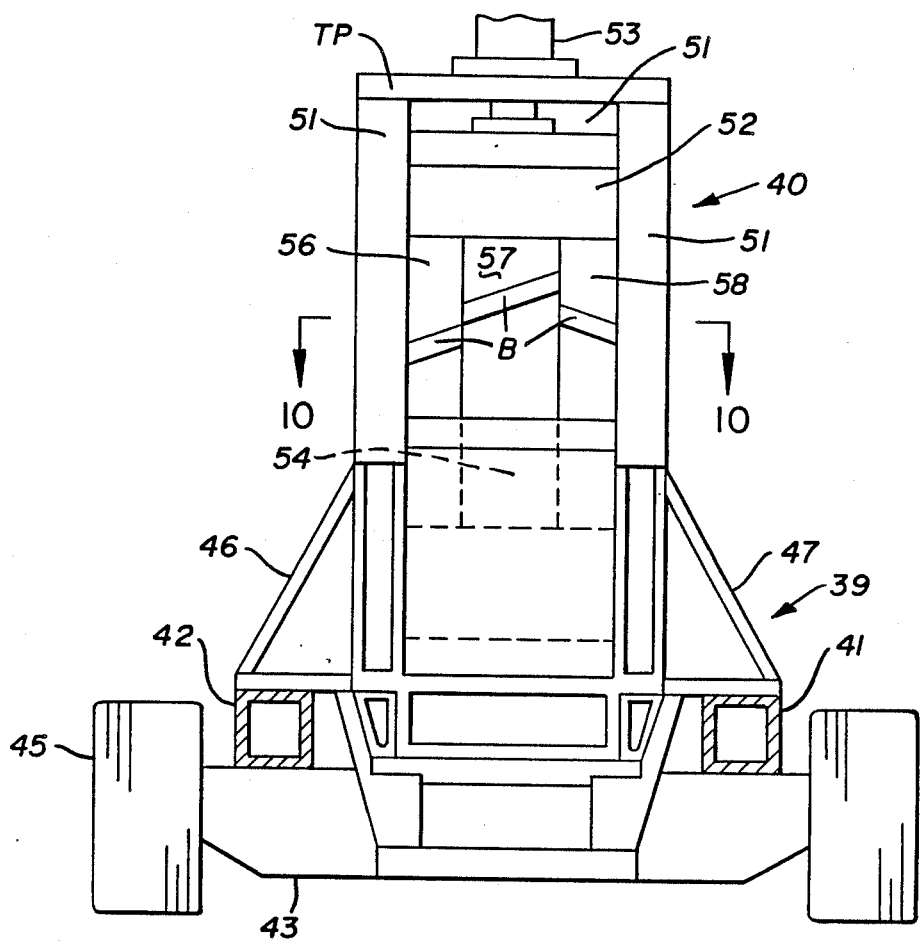
FIG. 9 is a section on lines 9—9 of FIG. 8.

Referring to FIGS. 1,2, and 3 of the drawings a hydraulic scrap shear 10 can be seen having a base 11 and a associated scrap feeder 12 on a support base 13. A scrap feeder is shown in FIGS. 3 and 4 of the drawings comprising a support table 14 having a stationary bottom 15. A pair of oppositely disposed stationary side walls 16 extend from said bottom 15 and have hinged elongated closures 17 thereon.

Pairs of spaced hydraulic piston and cylinder assemblies 18 and 19 are positioned on respective sides of the support table 14 and are pivotally connected to said elongated closures 17 activating same.

A hydraulic ram 20 is positioned at one end of said scrap feeder 12 and is used to compress and advance the scrap S therein towards the shear 10. Scrap feeders of this type are well known and typical in the art and are well understood.

Referring now to FIGS. 1,2, and 3 of the drawings the scrap shear 10 comprises a vertically disposed inverted U-shaped support frame 21 positioned on the base 11. The support frame 21 defines a guide and support for a shear member 22 that is connected to and driven by a hydraulic piston and cylinder assembly 23 positioned on the top of the support frame 21. A shearing block 24 is aligned directly below said shear member 22 and is of a registering configuration with that of said shear member. The shear block 24 has a plurality of shear blades 25 mounted thereon in right angular relation to one another on the same horizontal plane. The shear member 22 has a recessed central area defining oppositely disposed parallel portions 26 and 27 and a connecting portion 28.

The configuration of the shear member 22 is such that it conforms to the positioning of a plurality of angularly positioned offset blades 29,30,31,32, and 33, best seen in FIGS. 1,2,4, and 7 of the drawings. The shear member 22 is so configured that the blades 29 and 31 are recessed on the lower front edges of the parallel portions 26 and 27 respectively and the blade 30 on the lower most recess edge of the connector portion 28. Each of the opposing blades 32 and 33 that is greater than the length of the blades 29, and 31 which are of an equal length all of which are aligned angularly from the horizontal plane of the shear member 22. Each of the blades 29,30 and 31 are also positioned at different vertical heights relative to each other and the shear block 24. The blades 32 and 33 extend respectively between blades 29 and 30 and 31, best seen in FIGS. 2 and 7 of the drawings.

The various angular inclination of the blades 29 through 33 positioned on the correspondingly configured shear member 22 creates as they engage the horizontal plane of the shear blades 25 on the shear block 24 a multiple segmented shearing action that is characterized by the fact that no two blades begin shearing at the same time. The scrap shearing is sequential beginning on one side of blade 29 then moving to the opposite side of blade 31 followed by blades 32 and 33 and finally blade 30 completing the cut. This shearing sequence maintains proportional and equal opposing forces imparted to the shear member 22 as the same cycles through the scrap S to be cut.

Referring now to FIG. 6 of the drawings, graphic illustrations 1A and 1B can be seen wherein 1A defines the shear pattern on a scrap section SS given by dotted lines thereon. Directional arrows associated with said dotted lines define the sequence of shearing A through E that corresponds to the before mentioned shearing sequence.

Illustration 1B of FIG. 6 shows a second or subsequent shearing of the scrap section SS after the initial shear. It can be seen that the shearing sequence defines uniform scrap blocks 34 and 35 on the first shear in illustrations 1A and scrap blocks 36,37 and 38 on the second and all subsequent shears in illustration 1B as the scrap section SS is advanced into the shear 10 by the ram 20. Since positioning of the shear section SS is required for proper operation the advancement of the ram 20 can be controlled by an operator or by an automatic sequencer that advances the relative position of the scrap section SS within the shear to the desired distance.

Figure 8:
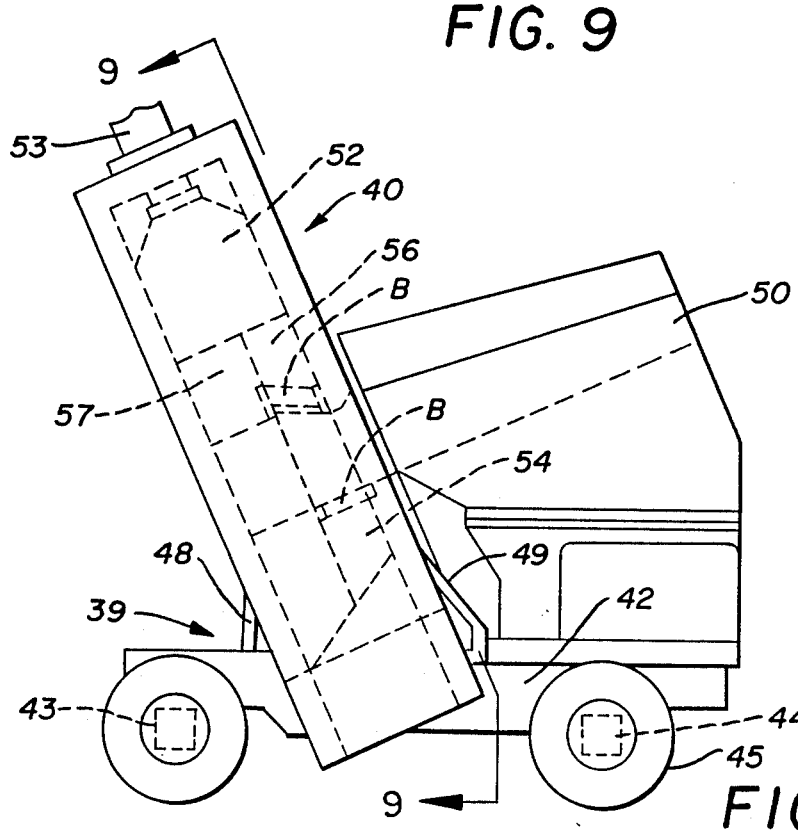
FIG. 8 is an alternate form of the invention disclosing a mobile multiple bladed shear.

Referring now to FIGS. 8 and 9 of the drawings, a mobile scrap shear support frame 39 can be seen having a scrap shear 40 angularly positioned within. The scrap shear support frame 39 comprises a pair of spaced parallel frame members 41 and 42 secured to transverse support beams 43 and 44. Wheel assemblies 45 are positioned on the opposite free ends of each of said support members 43 and 44. Shear supports 46,47,48, and 49 position and hold said scrap shear 40 on said support frame 39 in the angular inclination hereinbefore described. A gravity feed hopper 50, seen in FIG. 8 of the drawings directs scrap into the shear 40.

Figure 10:
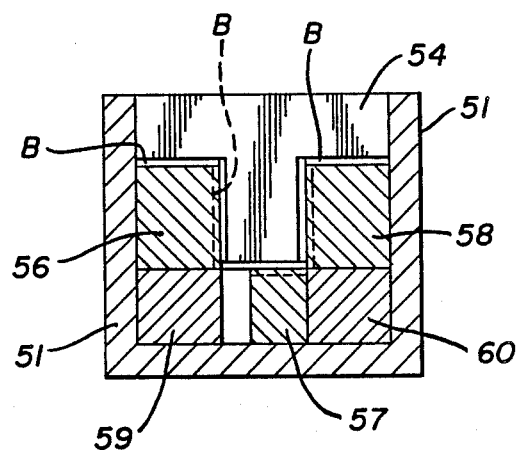
FIG. 10 is a section on lines 10—10 of FIG. 9.

The scrap shear 40 is comprises of a generally elongated U-shaped angularly inclined support and guide frame 51. A shear member 52 is positioned within the guide frame 51 and has a piston and cylinder assembly 53 connected thereto and extending from a top portion TP of the guide frame 51. A shear block 54 is aligned directly below the shear member 52 and is of a registering configuration with that of said shear member 52. The shear block 54 has a plurality of shear blades B positioned thereon the same as that of said shear block 24 hereinbefore described. The shear member 52 has a unified upper portion with three downwardly extending shear blade mounting portions 56,57, and 58, best seen in FIG. 10 of the drawings.

A plurality of shear blades B are positioned on said mounting portions 56,57, and 58 in same angular alignment ot one another as on said shear member 22 hereinbefore described.

A pair of oppositely disposed scrap stops 59 and 60 extend from the U-shaped support and guide frame 51 to a point opposite said shear blades B on the shear block 54.

A portion 61 of the guide frame 51 between said scrap stops 59 and 60 acts as a scrap stop in the same manner as the scrap stops 59 and 60 by restricting and positioning a pre-determined amount of scrap S between said scrap stops and engagement by the shear blades B on the shear member 22 as the scrap S is supplied to the scrap shear 40 via the gravity feed hopper 50 on the mobile scrap shear support frame 39.

As the scrap section SS is sheared as described above, compression and compaction of the scrap takes place from the shear lines forming uniform scrap blocks.

Thus, it will be seen that a new and useful scrap shear has been illustrated and described and it will be apparent to those skilled in the art that various modifications and changes may be made therein without departing from the spirit of the invention.

Therefore, I claim:

1. A hydraulic scrap shear for compaction and multiple segmentation in sequence shearing of scrap fed into the shear in a scrap feed direction into uniform scrap blocks, which comprises: a support and guide frame, a shearing block within said frame, a shear member within said frame registerable with said shear block and moving in an essentially linear direction in a vertical plane, shear block shear blades positioned on said shear block in right angular and co-planar relation to one another, said shear block shear blades including a central blade extending transverse to the scrap feed direction, side blades connectd to opposite ends of said central blade and extending in the scrap feed direction and outer side blades connected to ends of said side blades that are remote from said central blade and which extend transverse to the scrap feed direction, means for moving said shear member within said support frame, multiple interconnected shear member blades positioned on said shear member, said shear member blades including a first blade extending transversely of the scrap feed direction, second and third blades connected to ends of said first blade and extending in the scrap feed direction and fourth and fifth blades connected to ends of said second and third blades that are remote from said first blade and which extend transversely of the scrap feed direction, each of said shear member blades being positioned angularly in relation to said co-planar shear block blades on said shear block and at right angles to each other, said blades being engageable on an elongated scrap section as said scrap section is intermittently advanced into said scrap shear, means for supporting and advancing said scrap section, each of said blades on said shear member being positioned at a different relative height to said registrable shear blades on said shear block, means on said shear member conforming to said angular position of said blades.

2. The hydraulic scrap shear of claim 1 wherein said means for moving said shear member within said support frame comprises a hydraulic piston and cylinder assembly positioned on said support frame and a power source connected thereto.

3. The hydraulic scrap shear of claim 1 wherein said means for advancing and supporting said scrap section comprises a scrap feeder.

4. The hydraulic scrap shear of claim 1 wherein said means on said shear member conforming to said angular position of said blade comprises multiple oppositely disposed vertically upstanding parallel portions and a interconnecting portion therebetween.

5. A hydraulic scrap shear for compaction and multiple segmentation in sequence shearing of scrap fed into the shear in a scrap feed direction, into uniform scrap blocks which comprises: a support and guide frame positioned at an angle from vertical, a shearing block within said frame, a shear member within said frame registerable with said shear block, said shear member being linearly movable within said frame, scrap stops extending from said support and guide frame, shear block blades positioned on said shear block in right angular and co-planar relation to one another, said shear block blades including a central blade extending transverse to the scrap feed direction, side blades connected to opposite ends of said central blade and extending in the scrap feed direction and outer side blades connected to ends of said side blades that are remote from said central blade and which extend transverse to the scrap feed direction, means for moving said shear member, multiple shear member blades positioned on said shear member, said shear member blades including a first blade extending transversely of the scrap feed direction, second and third blades connected to ends of said first blade and extending in the scrap feed direction and fourth and fifth blades connected to ends of said second and third blades that are remote from said first blade and which extend transversely of the scrap feed direction, each of said shear member blades being positioned angularly in relation to sai co-planar shear block blades on said shear block and at right angles to adjacent shear block shear blades, said blades being engageable on a scrap section intermittently advancing into said scrap shear, means for supporting and advancing said scrap shear between said scrap stops, each of said shear member blades on said shear member positioned at a different relative height to said registerable shear block blades on said shear block, means on said shear member conforming to said angular positioning of said blades.

6. The hydraulic scrap shear of claim 6 wherein said means for advancing said scrap shear to said scrap comprises a mobile scrap shear support frame, a feed hopper on said support frame angularly positioned thereon.

* * * * *